United States Patent [19]

Nomura et al.

[11] 4,128,682
[45] Dec. 5, 1978

[54] AUTO CEILING PANEL AND ITS MANUFACTURING METHOD

[75] Inventors: Takao Nomura; Yoshiro Umemoto, both of Nagoya; Tatsuo Sakamoto, Okazaki, all of Japan

[73] Assignee: Toyota Jidosha Kogyo Kabushiki Kaisha, Aichi, Japan

[21] Appl. No.: 891,643

[22] Filed: Mar. 30, 1978

[51] Int. Cl.$^2$ .................. B62D 25/06; B32B 3/10; B32B 3/26

[52] U.S. Cl. ................... 428/138; 156/219; 156/245; 156/252; 156/306; 181/290; 264/321; 296/137 A; 428/158; 428/213; 428/313; 428/315

[58] Field of Search .......... 296/137 A, 137 R; 181/288, 290–294; 156/219, 252, 253, 245, 306; 264/321; 428/137, 138, 158, 159, 213–215, 310, 313, 315

[56] References Cited

U.S. PATENT DOCUMENTS

| | | | |
|---|---|---|---|
| 3,647,588 | 3/1972 | Greig | 428/313 |
| 3,697,126 | 10/1972 | Tiffin et al. | 428/315 |
| 3,954,537 | 5/1976 | Alfter et al. | 428/315 |
| 3,966,526 | 6/1976 | Doerfling | 156/252 |
| 4,073,991 | 2/1978 | Focht | 428/315 |

*Primary Examiner*—William J. Van Balen
*Attorney, Agent, or Firm*—Oblon, Fisher, Spivak, McClelland & Maier

[57] ABSTRACT

Auto ceiling panel with an improved sound-absorbing effect which is obtained by thermally fusing a polyethylene foam with numerous small holes and another polyethylene foam with numerous large holes with a metal lath sandwiched between them; and its manufacturing method.

10 Claims, 6 Drawing Figures

AUTO CEILING PANEL AND ITS MANUFACTURING METHOD

BACKGROUND OF THE INVENTION (1) Field of the Invention

The present invention relates to an auto ceiling panel with an improved sound-absorbing effect and its manufacturing method.

(2) Description of the Prior Art

The conventional auto ceiling panel is a four-layer structure of a metal lath with a vinyl chloride sheet-attached polyethylene foam and another polyethylene foam pasted on both sides thereof, but the polyethylene foam has isolated air bubbles and accordingly with poor permeability, its effect of absorbing the sound is dubious.

SUMMARY OF THE INVENTION

The primary object of the present invention is to provide an auto ceiling panel with an improved sound-absorbing effect.

Another object of the present invention is to provide an auto ceiling panel with an improved sound-absorbing effect which does not spoil the auto interior look.

Still another object of the present invention is to provide the manufacturing method of the above-mentioned auto ceiling panel.

DESCRIPTION OF THE PREFERRED EMBODIMENT

Figure 1:
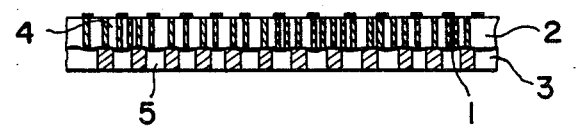
FIG. 1 is a sectional view of an auto ceiling panel according to the present invention.

In the auto ceiling panel according to the present invention a polyethylene foam with small holes is fused to another polyethylene foam with large holes, with a metal lath sandwiched between them; therefore with through-holes secured at least in the large-hole part, the sound-absorbing effect can be improved.

One embodiment of the present invention is to be described referring to the drawings.

Figure 2:
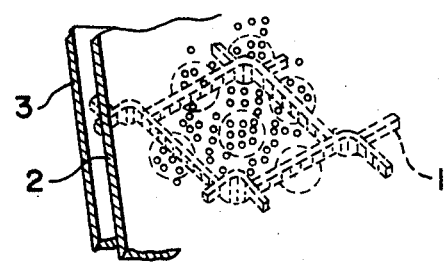
FIG. 2 is an oblique view of the auto ceiling panel in FIG. 1.

In FIGS. 1 and 2, the polyethylene foams 2, 3 are laminated with an interlayer of the metal lath 1. The specific gravities of them are 0.02-0.1 and they are respectively bored with numerous holes. The hole 4 in the polyethylene foam 2 which constitutes the auto interior is a small one with its diameter 0.1-2.0 mm, while the hole 5 of the polyethylene foam 3 which constitutes the lining of the auto ceiling is a large one with its diameter 2.0-5.0 mm.

Thus in this panel which represents a pasted combination of the polyethylene foam 3 with large holes 5 and the polyethylene foam 2 with small holes 4, the holes are more likely to become through-ones than in the case of small-holed polyethylene foams being pasted together; at least it is certain that the holes become invariably through-ones where a small hole 4 overlaps a large hole 5.

Next the manufacturing method of such an auto ceiling panel is to be described.

Figure 3:
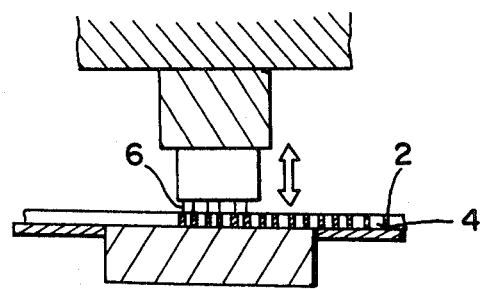
FIG. 3 is a front elevation view of a punching machine to be used for manufacturing the auto ceiling panel in FIG. 1.

At first, as indicated in FIG. 3, the polyethylene foams 2 and 3 are prepared respectively by boring small holes 4 of 0.1-2 mm diameter in a polyethylene sheet of 0.02-0.1 specific gravity and boring large holes 5 of 2.0-5.0 mm diameter in another polyethylene sheet, by means of a punching machine 6.

Boring is done before pasting together the foams. Therefore the metal lath 1 to be sandwiched does not obstruct the work.

Figure 4:
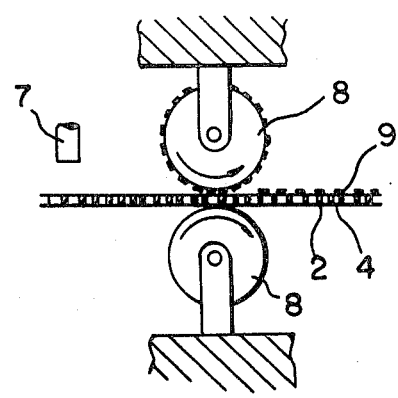
FIG. 4 is a front elevation view of an embossing machine to be used for manufacturing the auto ceiling panel in FIG. 1.

Next, as indicated in FIG. 4, the polyethylene foam 2 with small holes 4 having a diameter 0.1-2.0 mm is heated by a heater 7 and then sent to an embossing roll 8, where it is given an embossed pattern 9.

The polyethylene foam 3 is not submitted to such an embossing. Embossed pattern given by the embossing roll 8 looks aesthetic. When the look is spoiled by small holes 4, it may be improved by application of a permeable leather.

Figure 5:
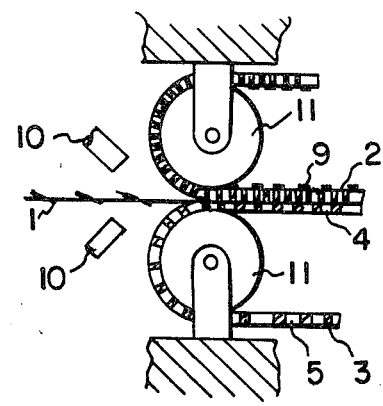
FIG. 5 is a front elevation view of a laminating machine to be used for manufacturing the auto ceiling panel in FIG. 1.

Next, as indicated in FIG. 5, the polyethylene foam 2 which has been embossed and made permeable by boring and the polyethylene foam 3 with large holes 5 are respectively heated by a heater 10; and after sandwiching a metal lath 1 therewith, they are fused together by a roll. Thus a ceiling panel material with through holes as illustrated in FIG. 1 is yielded. The panel material with this structure, characterized by rigidity and soundproofness, makes a highly acoustical ceiling panel.

Figure 6:
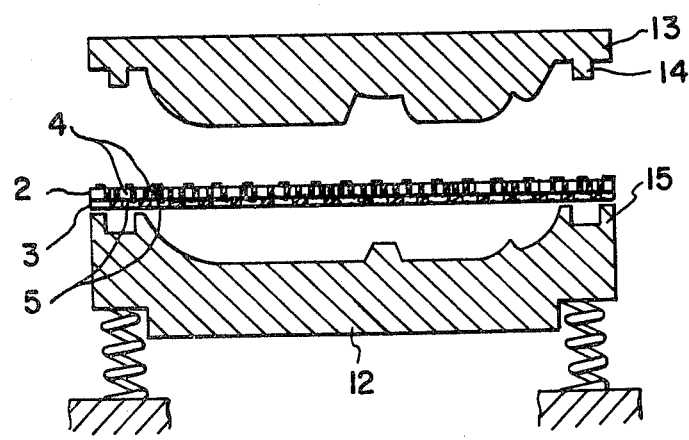
FIG. 6 is a front elevation view of a molding machine to be used for manufacturing the auto ceiling panel in FIG. 1.

Next, the panel material is cut to a specified size and then is press-molded to a specific profile by a cold press-molding machine shown in FIG. 6. The press-molding machine is equipped with a movable top mold 13 which is capable of going up and down against a stationary bottom mold 12, a male member 14 for wrinkle prevention and a female member 15. The panel material is laid with its side to be embossed up. The top mold 13 together with the anti-wrinkle male member 14 is lowered to squeeze the fringe of the panel material between the male and female members 14, 15. Thus the panel material is molded to a specific profile by the top 13 and the bottom mold 12 with a wrinkle formation prevented.

In this ceiling panel at least where the small hole 4 and the large hole 5 overlap each other, perfectly through holes are constituted giving high permeability to the panel, and accordingly a highly acoustical effect of it.

The following benefits accrue from the auto ceiling panel and its manufacturing method according to the present invention:

(a) Since the panel is such a structure that a polyethylene foam with small holes on the auto interior side is pasted to another polyethylene foam with large holes on the ceiling lining side, the sound-absorbing effect is remarkably better than in the conventional panel.

(b) The small holes are so fine as not to spoil the interior appearance and so many as to give a sufficiently good effect of absorbing the sound; besides an embossed pattern is given to the surface; and accordingly an aesthetic effect is also assured.

(c) Sandwiching of metal lath facilitates thermal fusion of polyethylene foams with small holes and with large holes.

(d) Since the interlayer between polyethylene foams is only a metal lath, through holes are little obstructed and a ceiling panel with as many through holes as to assure the acoustical effect can be manufactured.

We claim:

1. Auto ceiling panel comprising:
    a polyethylene foam on the auto interior side which has been bored with numerous small holes;
    a polyethylene foam on the ceiling side to be pasted to said polyethylene foam which has been bored with numerous large holes;
    and a metal lath sandwiched between said auto interior side polyethylene foam and said ceiling side polyethylene foam.

2. Auto ceiling panel of claim 1, wherein the small holes bored in said interior side polyethylene foam are 0.1 mm – 2 mm in diameter.

3. Auto ceiling panel of claim 1, wherein the large holes in said ceiling side polyethylene foam are 2.0 mm – 5.0 mm in diameter.

4. Auto ceiling panel of claim 1, wherein an embossed pattern is given to said interior side polyethylene foam.

5. Auto ceiling panel of claim 1, wherein a permeable leather is attached to the interior side surface of said interior side polyethylene foam.

6. Auto ceiling panel of claim 1, wherein said interior side polyethylene foam and said ceiling side polyethylene foam are thermally fused together with a metal lath sandwiched between them.

7. Auto ceiling panel manufacturing method characterized by comprising:
    a step of boring numerous small holes in a polyethylene foam and boring numerous large holes in another polyethylene foam;
    a step of giving an embossed pattern to only the small-holed polyethylene foam before or after its boring;
    a step of thermally fusing together said embossed, small-holed polyethylene foam and said large-holed polyethylene foam with a metal lath sandwiched between them;
    and a step of molding a laminated product thus obtained to a specific profile of auto ceiling in a cold press-molding machine.

8. Auto ceiling panel manufacturing method of claim 7, wherein the diameter of a small hole bored in one polyethylene foam is set at 0.1 mm – 2.0 mm.

9. Auto ceiling panel manufacturing method of claim 7, wherein the diameter of a large hole bored in the other polyethylene foam is set at 2.0 mm – 5.0 mm.

10. Auto ceiling panel manufacturing method of claim 7, wherein the interior side surface of one polyethylene foam is attached with a permeable leather in an additional step.